United States Patent
Grufman et al.

(10) Patent No.: US 10,606,279 B2
(45) Date of Patent: Mar. 31, 2020

(54) 3D MAP GENERATION BY A ROBOTIC WORK TOOL

(71) Applicant: HUSQVARNA AB, Huskvarna (SE)

(72) Inventors: Stefan Grufman, Bankeryd (SE); Björn Mannefred, Jönköping (SE); Magnus Öhrlund, Malmbäck (SE)

(73) Assignee: HUSQVARNA AB, Huskvarna (SE)

( * ) Notice: Subject to any disclaimer, the term of this patent is extended or adjusted under 35 U.S.C. 154(b) by 103 days.

(21) Appl. No.: 15/538,767

(22) PCT Filed: Nov. 26, 2015

(86) PCT No.: PCT/EP2015/077845
§ 371 (c)(1),
(2) Date: Jun. 22, 2017

(87) PCT Pub. No.: WO2016/102142
PCT Pub. Date: Jun. 30, 2016

(65) Prior Publication Data
US 2017/0344024 A1    Nov. 30, 2017

(30) Foreign Application Priority Data
Dec. 23, 2014 (SE) ...................................... 1451644

(51) Int. Cl.
*G05D 1/02* (2006.01)
*G01S 19/01* (2010.01)
*A01D 34/00* (2006.01)

(52) U.S. Cl.
CPC .......... *G05D 1/0274* (2013.01); *A01D 34/008* (2013.01); *G01S 19/01* (2013.01); *G05D 2201/0208* (2013.01)

(58) Field of Classification Search
CPC .......... G05D 1/0274; G05D 2201/0208; G05D 1/021; G05D 1/0219; G05D 1/0225;
(Continued)

(56) References Cited

U.S. PATENT DOCUMENTS

| 7,227,327 B2 | 6/2007 | Im |
| 7,272,474 B1 | 9/2007 | Stentz et al. |

(Continued)

FOREIGN PATENT DOCUMENTS

| CN | 1876336 A | 12/2006 |
| CN | 101196744 A | 6/2008 |

(Continued)

OTHER PUBLICATIONS

International Search Report and Written Opinion for International Application No. PCT/EP2015/077845 dated Feb. 8, 2016.
(Continued)

*Primary Examiner* — Brian P Sweeney
(74) *Attorney, Agent, or Firm* — Burr & Forman LLP

(57) ABSTRACT

A robotic work tool (100) comprising an altitude sensor (185) for providing a current altitude reading (HRL) and a controller (110) configured to receive the current altitude reading (HRL) from the altitude sensor (185); determine an altitude (H) based on the current altitude reading (HRL); determine a current position; and generating a map indicating elevations by including the determined altitude (H) for the current position in the map. A robotic work tool system (200) comprising a robotic work tool (100) and a reference altitude sensor (285) for providing a reference altitude reading (HCS), wherein the robotic work tool (100) is further configured to receive the reference altitude reading (HCS) from the reference altitude sensor (285); and determine the altitude (H) based on the current altitude reading (HRL) and the reference altitude reading (HCS).

9 Claims, 3 Drawing Sheets

(58) Field of Classification Search
CPC .... G05D 1/0265; G01S 19/01; A01D 34/008; G06T 17/05; G09B 29/00
USPC .......................................................... 701/23
See application file for complete search history.

(56) References Cited

U.S. PATENT DOCUMENTS

| | | | |
|---|---|---|---|
| 7,418,762 | B2 | 9/2008 | Arai et al. |
| 7,787,991 | B2 | 8/2010 | Jeung et al. |
| 8,452,450 | B2 | 5/2013 | Dooley et al. |
| 8,565,958 | B1 | 10/2013 | Montemerlo et al. |
| 8,983,738 | B2 * | 3/2015 | Avitzur .................. E02F 9/205 701/50 |
| 9,072,218 | B2 | 7/2015 | Johnson et al. |
| 9,119,341 | B2 | 9/2015 | Jangenstedt |
| 9,220,194 | B2 | 12/2015 | Ulmefors et al. |
| 9,234,965 | B2 | 1/2016 | Venkatraman |
| 9,280,158 | B2 | 3/2016 | Bron et al. |
| 9,310,207 | B2 | 4/2016 | Booij et al. |

FOREIGN PATENT DOCUMENTS

| | | |
|---|---|---|
| CN | 102083352 A | 6/2011 |
| CN | 102448283 A | 5/2012 |
| CN | 102811604 A | 12/2012 |
| CN | 102844722 A | 12/2012 |
| CN | 102934565 A | 2/2013 |
| CN | 103542800 | 1/2014 |
| JP | 2001-344017 A | 12/2001 |
| JP | 2004-267236 A | 9/2004 |
| JP | 2006-268652 A | 10/2006 |
| JP | 2009-281741 A | 12/2009 |
| JP | 2013-543968 A | 12/2013 |
| JP | 2013-544351 A | 12/2013 |
| JP | 2014-119349 A | 6/2014 |
| JP | 2015-519965 A | 7/2015 |
| WO | 2013/071257 A2 | 5/2013 |

OTHER PUBLICATIONS

International Preliminary Report on Patentability for International Application No. PCT/EP2015/077845 dated Jun. 27, 2017.

Morales Yoichi et al.,"Vehicle Localization in Outdoor Mountainous Forested Paths and Extension of Two-Dimensional Road Centerline Maps to Three-Dimensional Maps", Advanced Robotics, vol. 24, Issue No. 4, pp. 489-513, Jan. 1, 2010.

Morales Yoichi et al.,"Vehicle localization in mountainous graveled paths", Intelligent Robots and Systems (IROS), 2012 IEEE/RSJ International Conference on, IEEE, pp. 4342-4347, https://ieeexplore.ieee.org/abstract/document/6386123/, Oct. 7, 2012, all enclosed pages cited.

Morales, Y., et al., "Vehicle Localization in Mountainous Gravelled Paths," IEEE/RSJ International Conference on Intelligent Robots and Systems, pp. 4342-4347 (Oct. 31, 2012).

* cited by examiner

3D MAP GENERATION BY A ROBOTIC WORK TOOL

TECHNICAL FIELD

This application relates to a method and a robotic work tool system for an improved map generation by a robotic work tool.

BACKGROUND

Contemporary robotic work tools are becoming more and more advanced and are able to perform more and more advanced tasks such as executing advanced operation patterns. In the example of lawnmower robots the advanced working pattern may be a complicated mowing pattern based on the layout of a garden including bushes, garden islands and other structures.

The advanced operating patterns are generally general in their plan and does not necessarily take all aspects of a garden into consideration, such as elevation changes. Steep slopes may make it difficult for a robotic work tool to perform a specified operating pattern as the robotic work tool may not be able to negotiate the slope or start sliding.

To successfully navigate such complicated operating patterns some contemporary robotic work tools employ satellite navigation, however, these do not work in all areas of a work area if some areas are blacked out from satellite reception.

It is furthermore difficult to specify a correct map for use with a GPS system as a user would have to input all altitudes manually. Even if the GPS were to be used for generating the map, the low accuracy of the GPS would inevitably lead to an incorrect map.

There is thus a need for a manner of enabling reliable operation of a robotic work tool even in situations where the robotic work tool may not be able to receive reliable and accurate signals.

SUMMARY

It is an object of the teachings of this application to overcome the problems listed above by providing a robotic work tool comprising an altitude sensor for providing a current altitude reading and a controller configured to receive the current altitude reading from the altitude sensor; determine an altitude based on the current altitude reading; determine a current position; and generating a map indicating elevations by including the determined altitude for the current position in the map.

It is also an object of the teachings of this application to overcome the problems listed above by providing a robotic work tool system comprising a robotic work tool according to above and a reference altitude sensor for providing a reference altitude reading, wherein the robotic work tool is further configured to receive the reference altitude reading from the reference altitude sensor; and determine the altitude based on the current altitude reading and the reference altitude reading.

In one embodiment the robotic work tool is a robotic lawnmower.

It is also an object of the teachings of this application to overcome the problems listed above by providing a method for use in a robotic work tool comprising an altitude sensor for providing a current altitude reading, said method comprising: receiving the current altitude reading from the altitude sensor; determining an altitude based on the current altitude reading; determining a current position; and generating a map indicating elevations by including the determined altitude for the current position in the map.

It is also an object of the teachings of this application to overcome the problems listed above by providing a method for use in a robotic work tool system comprising a robotic work tool arranged to operate according to above, wherein said robotic work tool system comprises a reference altitude sensor for providing a reference altitude reading, wherein the method further comprises receiving the reference altitude reading from the reference altitude sensor; and determining the altitude based on the current altitude reading and the reference altitude reading.

The inventors of the present invention have realized, after inventive and insightful reasoning that by utilizing barometers or other altitude sensors, a map indicating elevations may be generated, also for areas that are blacked out from reliable satellite reception.

One benefit is that a map indicating elevations may be generated simply and without the need for costly navigation equipment, simply by allowing the robotic work tool to move around in the work area. Another benefit is that accurate altitude readings will be available for all parts of a working area, not only such areas where GNSS reception is reliable.

One benefit of having a map indicating elevations is that a mowing pattern may be planned so that a risk that the robotic work tool should slide down a slope or not be able to go up a slope is greatly reduced. For example, if the map indicating elevations indicates a steep slope, the robotic work tool 100 may be configured to plan its mowing pattern around this area so that the slope is traveled in a sideways or serpentine fashion and not head on to reduce the risk of the robotic work tool stalling. Another example is that if the map indicating elevations indicates a steep slope, the robotic work tool 100 may be configured to plan its mowing pattern around this area so that the slope is not traveled at too extreme angles when the weather is bad. This can enable the robotic work tool to reduce the risk of slipping down a slope that has become slippery due to rain. The operation in such areas may alternatively simply be postponed.

Furthermore, the barometer may be used to detect that the weather is turning bad and then plan the mowing operation accordingly so as to refrain from mowing in steep areas.

Yet another benefit is achieved if the altitude data is transferred to the robotic work tool as part of the control signal emitted by the charging station as no additional equipment is needed. It should be noted that the control signal may also be transferred through a guide wire and also through a general magnetic field for navigating or steering the robotic work tool towards the charging station.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
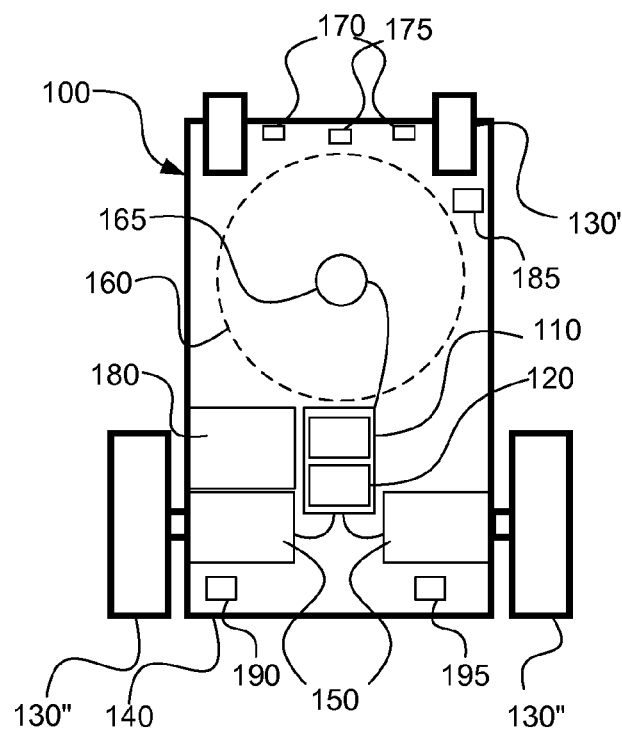
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Other examples of position determining devices 190 include optical (such as laser) position determining devices, other radio frequency position determining systems, and ultrawideband (UWB) beacons and receivers. The robotic work tool 100 is further arranged with at least one sensor 195 for providing signals for deduced reckoning navigation. Examples of such deduced reckoning navigation sensors 195 are odometers, accelerometers, gyroscopes and compasses.

The robotic work tool 100 also comprises an altitude sensor, such as a barometer 185, for determining an altitude reading.

The robotic work tool 100 may also comprise a communication interface 175. The communication interface 175 may be arranged to receive and transmit wireless signals through a radio frequency interface for communicating with a charging station (referenced 210 in FIG. 2). The communication interface 175 may alternatively or additionally be arranged to receive and possibly transmit signals through a boundary wire (referenced 250 in FIG. 2) for communicating with a charging station (referenced 210 in FIG. 2). In one embodiment the communication interface 175 is embodied by the sensors 170 providing signal readings that are interpreted by the controller 110.

Figure 2:
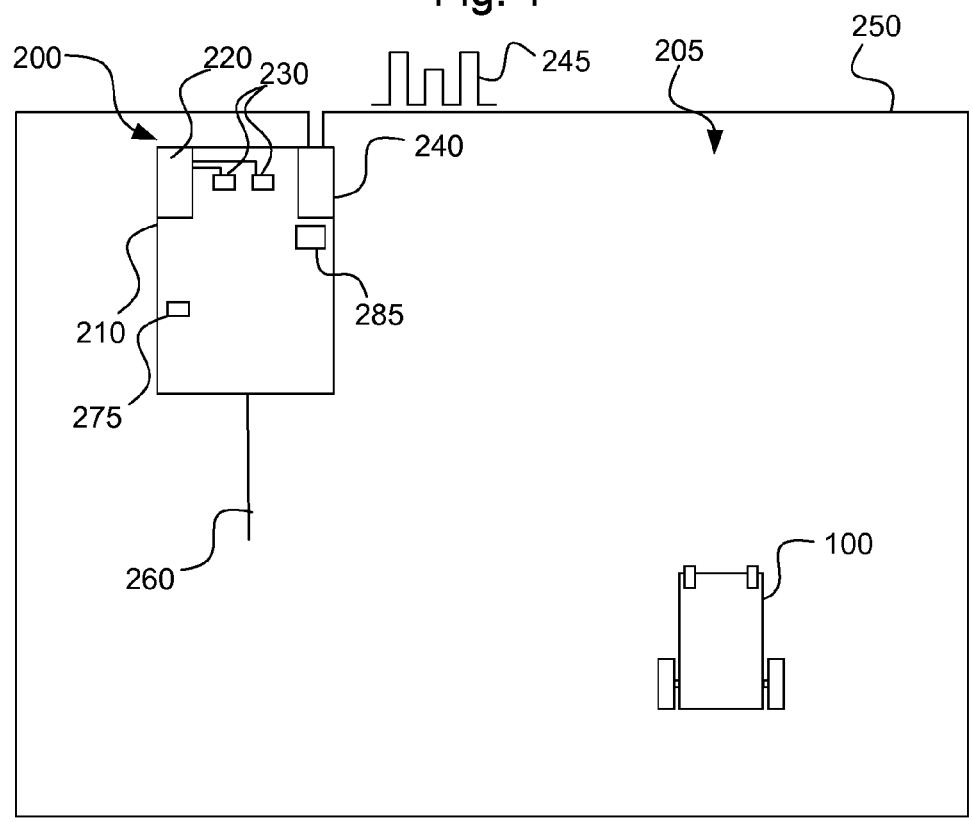
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (referenced 235 in FIG. 3) of the robotic work tool 100 for charging the battery 180 of the robotic work tool 100. The charging station 210 also has, or may be coupled to, a signal generator 240 for providing a control signal 245 to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

The charging station 210 also comprises a reference altitude sensor, such as a barometer 285, for determining an altitude reading.

The charging station 210 may also comprise a communication interface 275. The communication interface 275 may be arranged to receive and transmit wireless signals through a radio frequency interface for communicating with the robotic work tool 100. The communication interface 275 may alternatively or additionally be arranged to receive and possibly transmit signals through the boundary wire 250 for communicating with the robotic work tool 100.

Figure 3:
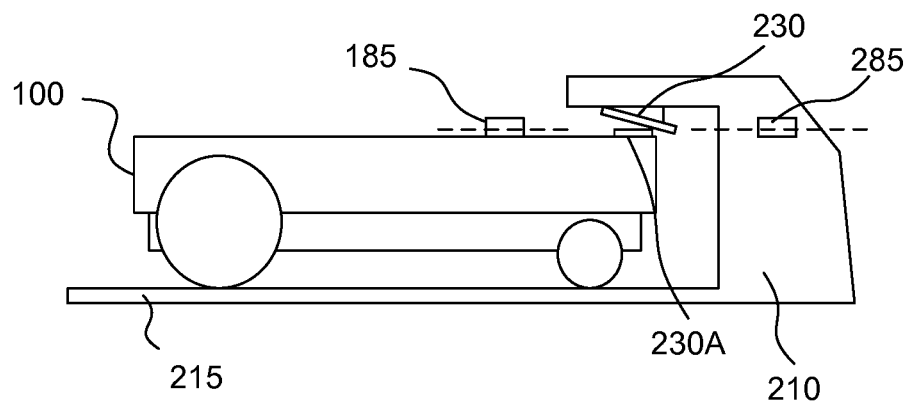
FIG. 3 shows a schematic view of a robotic working tool system in operation according to one embodiment of the teachings of this application.

FIG. 3 shows another schematic view of a robotic work tool system 200 according to the teachings herein, such as the robotic work tool system 200 of FIG. 2, being depicted here in a side view. The charging station 210 may be arranged with a plate 215 which the robotic work tool 100 enters partially or completely when docking in the charging station 210. The use of a charging station plate 215 ensures that the robotic work tool 100 is at a known or same level compared to the charging station 210, meaning that the barometer 185 of the robotic work tool 100 should give the same reading as the barometer 285 of the charging station 210. The barometer 185 of the robotic work tool 100 may be arranged to be at a same level as the barometer 285 of the charging station 210 when the robotic work tool 100 is docked in the charging station 210. This is indicated by the two dashed lines in FIG. 3.

This enables the robotic work tool 100 to calibrate the barometer readings when the robotic work tool 100 is docked in the charging station 210. Alternatively or additionally, the charging station 210 may also be arranged to calibrate the barometer readings when the robotic work tool 100 is docked in the charging station 210.

The barometer may also be arranged at different levels still be calibrated taking the difference in level into account.

Figure 4:
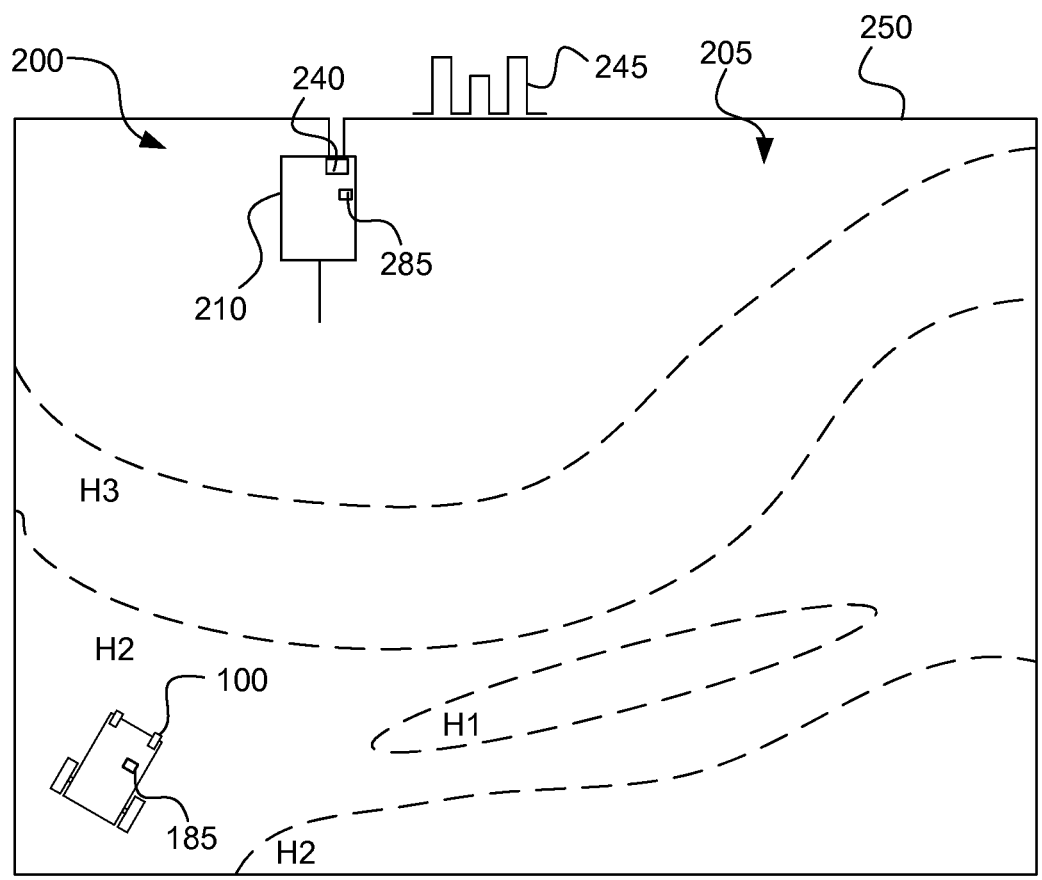
FIG. 4 shows a schematic view of a robotic working tool system in operation according to one embodiment of the teachings of this application.

FIG. 4 shows another schematic view of a robotic work tool system 200 according to the teachings herein, such as the robotic work tool system 200 of FIG. 2.

A boundary wire 250 encloses a working area 205 in which the robotic work tool 100 is configured to operate within. In the example of FIG. 4, the working area 205 has different levels as is indicated by the elevation contours H1, H2 and H3 (dashed lines).

To enable the robotic work tool 100 to generate a map indicating elevations, such as a three-dimensional map or a two dimensional map having elevation contours or other elevation indications, of the work area 205, the robotic work tool 100 is configured to receive altitude readings from the barometer 185 and base the map being generated on these readings. It should be noted that the robotic work tool 100 may alternatively generate the map by modifying an existing map. The existing map may have elevation indications already which are corrected or supplemented. The existing map may also be without elevation indications whereby the map is generated by adding elevation indications to the existing map.

As the robotic work tool 100 travels over the work area 205, elevation or altitude readings will be taken and added to the map being generated (or modified as exemplified in the above) thereby providing a map indicating elevations. The altitude readings are stored in the map being generated for a current position. The current position may be determined based on signals received through the position determining device 190, such as a GNSS device. The current position may alternatively or additionally be determined based on signals received through the at least one deduced reckoning navigation sensor 195.

It should be noted that although it is disclosed that the barometer provides altitude readings, the barometers may only provide raw sensor data (or semi processed sensor data) that is processed and interpreted by a controller to provide an altitude or elevation reading.

As mentioned in the summary, the barometer can also be used to provide a weather indication which may be used to plan a mowing operation.

To allow for errors due to changes in ambient pressure, both during an operation session as well as over time, and to allow for errors due to a sensitivity drift in the barometer 185, the charging station 210 is arranged with a barometer 285.

Figure 5:
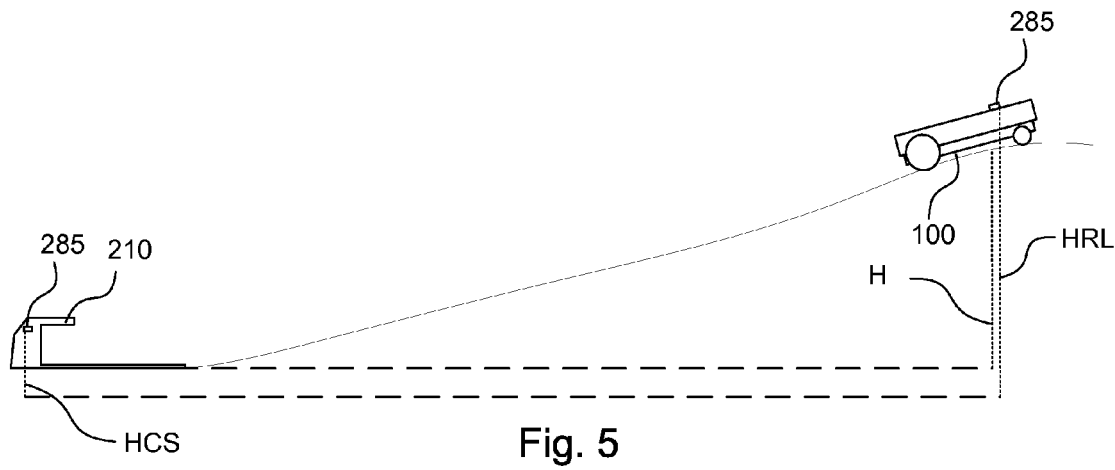
FIG. 5 shows a schematic view of a robotic working tool system in operation according to one embodiment of the teachings of this application.

FIG. 4 shows another schematic view of a robotic work tool system 200 according to the teachings herein, such as the robotic work tool system 200 of FIGS. 2, 3 and 4. The robotic work tool 100 is at a different elevation or altitude than the charging station 210. The reference barometer 285 will provide an altitude reading for the charging station 210 (indicated as HCS in FIG. 5). The current altitude sensor 185 of the robotic work tool 100 will provide a current altitude reading for the robotic work tool 100 (indicated as HRL in FIG. 5). The actual or relative altitude may be derived as H=HRL−HCS.

The charging station 210 receives altitude readings from the barometer 285 of the charging station 210 and sends these to the robotic work tool 100 via the communication interface 175, by the signal generator 240 modifying the control signals 245 being transmitted through the boundary wire 250 to carry altitude data for the reference altitude sensor 285. The signal generator 240 and the boundary wire 250 thereby making up a communication interface 275. Alternatively, the reference barometer 285 or the charging station 210 sends the altitude readings directly to the robotic work tool 100, wherein a wireless communication interface 275 is included or arranged with the charging station or the reference barometer 285.

Even though the reference altitude sensor 285 has been disclosed to be arranged on the charging station, the barometer 285 may also or alternatively be arranged as a separate device. The barometer 285 of the charging station 210 is thus a reference barometer 285 or reference altitude sensor 285 for providing a reference altitude reading (HCS)

The robotic work tool 100 may be configured to determine that reliable signals are received from the position determining device 190 and in response thereto calibrating the current altitude sensor 185 based on the readings received from the position determining device 190. This allows for calibrating the current altitude sensor more frequently.

The charging station 210 and/or the robotic work tool 100 may also be configured to store a known altitude for the reference barometer 285 and calibrate the current altitude sensor 185 and/or the reference altitude sensor 285 based on the known altitude for the reference barometer 285.

One benefit is that a map indicating elevations may be generated simply and without the need for costly navigation equipment. Another benefit is that accurate altitude readings will be available for all parts of the working area 205, not only such areas where GNSS reception is reliable.

One benefit of having a map indicating elevations is that a mowing pattern may be planned so that a risk that the robotic work tool should slide down a slope or not be able to go up a slope is greatly reduced. For example, if the map indicating elevations indicates a steep slope, the robotic work tool 100 may be configured to plan its mowing pattern around this area so that the slope is traveled in a sideways or serpentine fashion and not head on to reduce the risk of the robotic work tool stalling. Another example is that if the map indicating elevations indicates a steep slope, the robotic work tool 100 may be configured to plan its mowing pattern around this area so that the slope is not traveled at too extreme angles when the weather is bad. This can enable the robotic work tool to reduce the risk of slipping down a slope that has become slippery due to rain. The operation in such areas may alternatively simply be postponed.

Figure 6:
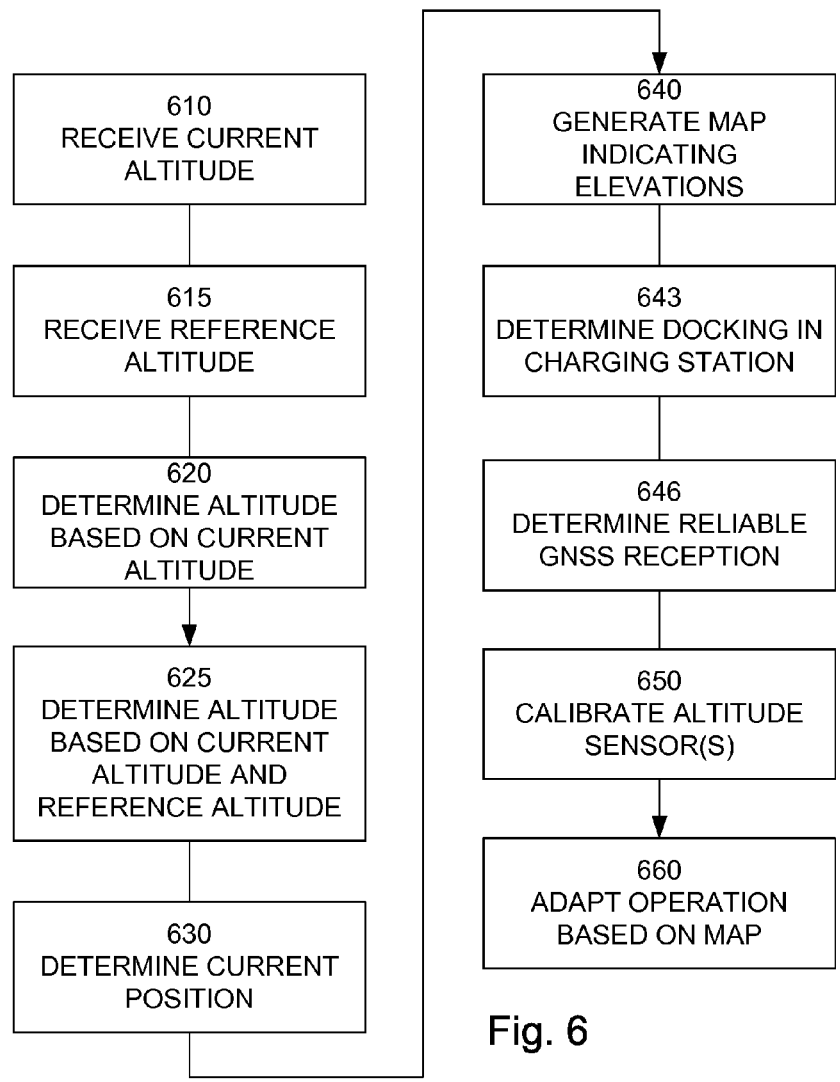
FIG. 6 shows a flowchart for a method for use in a robotic working tool system according to one embodiment of the teachings of this application.

FIG. 6 shows a flowchart for a general method for controlling a robotic work tool 100 and/or a robotic work tool system 200 according to the teachings herein. The robotic work tool 100 is configured to receive 610 a current altitude reading HRL from the altitude sensor 185 and to determine 620 an altitude (H) based on the current altitude reading (HRL). The robotic work tool 100 also determines 630 a current position; and generates 640 a map indicating elevations by including the determined altitude (H) for the current position in the map. The robotic work tool 100 may also receive 615 a reference altitude from the reference altitude sensor 285 and determine 625 the altitude based on the current altitude reading and the reference altitude reading.

The robotic work tool may further be configured to calibrate 650 the current altitude sensor 185 and/or the reference altitude sensor 285. The calibration may be performed when the robotic work tool 100 determines 643 that it has docked in the charging station 210, wherein the current altitude sensor 185 and the reference altitude sensor 285 should give the same readings. The calibration may also or alternatively be performed when the robotic work tool 100 determines 646 that signals are reliably received from the GNSS device 190. The robotic work tool 100 is further configured to 660 adapt a mowing operation based on the generated map.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising a robotic work tool comprising;
   an altitude sensor for providing a current altitude reading;
   a first communication interface; and
   a controller configured to:
      receive the current altitude reading from the altitude sensor;
      determine an altitude based on the current altitude reading;
      determine a current position; and
      generate a map indicating elevations by including the determined altitude for the current position in the map;
   wherein the robotic work tool system further comprises a reference altitude sensor for providing a reference altitude reading and a second communication interface,
   wherein the robotic work tool is further configured to:
      receive, at the first communication interface from the second communication interface, the reference altitude reading from the reference altitude sensor; and
      determine the altitude based on the current altitude reading and the reference altitude reading;
   wherein the robotic work tool system further comprises a charging station upon which the reference altitude sensor and the second communication interface are arranged;
   wherein the robotic work tool is further configured to determine that the robotic work tool has docked in the charging station, and in response thereto calibrate the current altitude sensor and/or the reference altitude sensor for providing accurate altitude readings.

2. The robotic work tool system according to claim 1, wherein the charging station comprises a boundary wire for demarcating a work area and a communication interface, and wherein the charging station is configured to transmit the altitude reading from the reference altitude sensor to the robotic work tool through the communication interface;
   and the robotic work tool further comprises a communication interface and wherein the robotic work tool is further configured to receive the altitude reading from the reference altitude sensor through the communication interface, wherein
   the communication interface of the charging station comprises a signal generator for generating control signals to be transmitted through the boundary wire, which control signals are modified to carry altitude data for the reference altitude sensor; and the communication interface of the robotic work tool comprises sensors for sensing the control signals being transmitted through the boundary wire and wherein the controller is configured to extract the altitude data for the reference altitude sensor from the sensed control signals.

3. The robotic work tool system according to claim 1, wherein the charging station comprises a wireless communication interface, and wherein the charging station is configured to transmit the altitude reading from the reference altitude sensor to the robotic work tool through the communication interface;

and the robotic work tool further comprises a wireless communication interface and wherein the robotic work tool is further configured to receive the altitude reading from the reference altitude sensor through the communication interface.

4. The robotic work tool system according to claim 1, wherein the robotic work tool further comprises a position determining device, comprising a Global Navigation Satellite System device, for determining a current position.

5. The robotic work tool system according to claim 4, wherein the robotic work tool is further configured to determine that reliable signals are received from the position determining device and in response thereto calibrating the current altitude sensor.

6. The robotic work tool system according to claim 1, wherein the robotic work tool further comprises at least one deduced reckoning navigation sensor for determining a current position.

7. The robotic work tool system according to claim 1, wherein the robotic work tool is further configured to adapt a mowing pattern based on the map indicating elevations.

8. The robotic work tool system according to claim 1, wherein the robotic work tool is a robotic lawnmower.

9. A method for use in a robotic work tool comprising an altitude sensor for providing a current altitude reading and a first communication interface, said method comprising:
receiving the current altitude reading from the altitude sensor;
determining an altitude based on the current altitude reading;
determining a current position; and
generating a map indicating elevations by including the determined altitude for the current position in the map, and wherein said robotic work tool system comprises a reference altitude sensor for providing a reference altitude reading and a second communication interface,
wherein the method further comprises:
receiving, at the first communication interface from the second communication interface, the reference altitude reading from the reference altitude sensor; and
determining the altitude based on the current altitude reading and the reference altitude reading;
wherein the robotic work tool system further comprises a charging station upon which the reference altitude sensor is arranged; and
wherein the method further comprises:
determining that robotic work tool has docked in the charging station, and
in response thereto, calibrating the current altitude sensor and/or the reference altitude sensor for providing accurate altitude readings.

\* \* \* \* \*